United States Patent
Ahn et al.

(10) Patent No.: US 9,773,618 B2
(45) Date of Patent: Sep. 26, 2017

(54) CAPACITOR

(71) Applicant: POINT ENGINEERING CO., LTD., Asan-si, Chungcheongnam-do (KR)

(72) Inventors: Bum Mo Ahn, Suwon-si (KR); Seung Ho Park, Hwaseong-si (KR); Tae Hwan Song, Cheonan-si (KR)

(73) Assignee: POINT ENGINEERING CO., LTD., Asan-si (KR)

( * ) Notice: Subject to any disclaimer, the term of this patent is extended or adjusted under 35 U.S.C. 154(b) by 83 days.

(21) Appl. No.: 14/831,964

(22) Filed: Aug. 21, 2015

(65) Prior Publication Data

US 2016/0064146 A1  Mar. 3, 2016

(30) Foreign Application Priority Data

Sep. 1, 2014  (KR) .................. 10-2014-0115157

(51) Int. Cl.
| | |
|---|---|
| *H01G 4/30* | (2006.01) |
| *H01G 4/12* | (2006.01) |
| *H01G 4/38* | (2006.01) |
| *H01G 4/005* | (2006.01) |
| *H01G 4/012* | (2006.01) |
| *H01G 4/228* | (2006.01) |

(52) U.S. Cl.
CPC ............ *H01G 4/30* (2013.01); *H01G 4/005* (2013.01); *H01G 4/012* (2013.01); *H01G 4/12* (2013.01); *H01G 4/38* (2013.01); *H01G 4/228* (2013.01)

(58) Field of Classification Search
CPC ........................................ H01G 4/30
USPC .............................. 361/301.4, 311
See application file for complete search history.

(56) References Cited

U.S. PATENT DOCUMENTS

| | | | |
|---|---|---|---|
| 6,212,057 B1 * | 4/2001 | Kohara | H01G 4/08 361/301.4 |
| 7,035,082 B2 * | 4/2006 | Jow | H01G 4/012 361/306.3 |
| 2004/0107569 A1 * | 6/2004 | Guzek | H01L 23/142 29/846 |

* cited by examiner

*Primary Examiner* — Eric Thomas
(74) *Attorney, Agent, or Firm* — Sughrue Mion, PLLC (57) ABSTRACT

The present invention relates to a capacitor. The capacitor includes a substrate; a dielectric layer formed on the substrate; and an electrode layer comprising a first electrode layer and a second electrode layer formed on the dielectric layer, wherein the first electrode layer and the second electrode layer are separated from each other, and at least a portion of the first electrode layer and at least a portion of the second electrode layer are disposed on a same surface. With this configuration, applying the electricity becomes easy, and since the first and the second electrode layers function as the electrodes being charged with different polarity electrical charges respectively, manufacturing thereof becomes easy, and the structure thereof is simple.

8 Claims, 6 Drawing Sheets

CAPACITOR

CROSS-REFERENCE TO RELATED PATENT APPLICATION

This U.S. non-provisional patent application claims priority under 35 U.S.C. §119 of Korean Patent Application No. 10-2014-0115157 filed on Sep. 1, 2014 in the Korean Patent Office, the entire contents of which are hereby incorporated by reference.

BACKGROUND

1. Technical Field

The present invention relates to a capacitor, more particularly, relates to a capacitor including an electrode layer comprising a first electrode layer and a second electrode layer formed on a dielectric layer, wherein the first electrode layer and the second electrode layer are separated from each other, and at least a portion of the first electrode layer and at least a portion of the second electrode layer are disposed on the same surface.

2. Description of the Related Art

Capacitor is used as a battery for storing or discharging electricity, or being utilized for its direct current blocking characteristics, and has a structure wherein a dielectric material is inserted between the two closely placed electrodes which are insulated from each other.

When a direct current is applied to the capacitor, the current starts to flow while the charges are being accumulated in each electrode, but the current stops to flow when the accumulation of the charges are completed. However, if the direct current is applied again after changing the electrodes, the current starts to flow instantaneously. Using such characteristics, the capacitor is used for blocking direct currents but passing the alternate currents, and also it is used for storing electricity.

Such capacitors are classified according to the types of dielectric materials used therein such as air, vacuum, gas, liquid, mica, ceramics, paper, plastic film, electrolyte, and the like.

As for electrolytic capacitors, there are aluminum electrolytic capacitors and tantalum electrolytic capacitors, and electrolytic capacitors generally means aluminum electrolytic capacitors. Electrolytic capacitor uses thin oxide film as a dielectric material and aluminum is used as an electrode material. Since very thin dielectric material can be made, relatively large capacitance can be obtained compared with the volume of the capacitor.

Meanwhile, recently researches on multi-layered ceramic capacitor (MLCC) which is made of alternately stacked ceramic layer and metal (nickel) layer are being actively conducted. A multi-layered ceramic capacitor is made by alternately stacking 200 to 1000 of ceramics layers and metal layers within 0.3 mm height which is a typical thickness of a hair.

A multi-layered ceramic capacitor can store electricity by stacking a plurality of ceramics layers and nickel layers using the principle that nickel conducts electricity since it is a metal, but ceramics cannot conduct electricity.

Multi-layered ceramic capacitors are essential components for the electronic products such as mobile phones, smart phones, LCD TVs, computers, and the like, each requiring several hundreds of MLCCs therein. Miniaturization trends in electronic apparatuses demand MLCCs of smaller in size but having larger capacitance, which require high level technologies.

However, the capacitors of the prior art have complicated structures, therefore, there is a problem that manufacturing thereof is not that easy.

(Patent Document)
Korean Patent Application Publication No. 2014-0106879

SUMMARY

An objective of the present invention, to solve the above described technical problem, is to provide a capacitor which is easy for being applied with electricity, and easy to be manufactured, and has a simple structure.

To achieve the above described objective, a capacitor according to an aspect of the present invention includes: a substrate; a dielectric layer formed on the substrate; and an electrode layer comprising a first electrode layer and a second electrode layer formed on the dielectric layer, wherein the first electrode layer and the second electrode layer are separated from each other, and at least a portion of the first electrode layer and at least a portion of the second electrode layer are disposed on a same surface.

A portion which separates the first electrode layer and the second electrode layer may be disposed at an upper portion or a lower portion of the substrate.

The first electrode layer and the second electrode layer may be formed so as to have different areas from each other on the same surface.

The substrate may be comprised of a metallic material capable of being anodized, and the dielectric layer may be comprised of an anodized layer.

The substrate may be comprised of a material having a dielectric property.

The dielectric layer may include an upper dielectric layer and a lower dielectric layer respectively formed on an upper surface of the substrate and the lower surface of the substrate, the electrode layer may include an upper electrode layer formed on an upper surface of the upper dielectric layer and an lower electrode layer formed on a lower surface of the lower dielectric layer, and the upper electrode layer and the lower electrode layer may be electrically connected to each other.

A vertically penetrating through hole may be formed at the substrate, and an internal dielectric layer adjacent to the upper dielectric layer and the lower dielectric layer may be formed in the through hole, and a connecting electrode layer electrically connecting the upper electrode layer and the lower electrode layer may be located inside the internal dielectric layer.

The capacitor may further include a side electrode layer formed on a side surface of the substrate so as to connect the upper electrode layer and the lower electrode layer.

The capacitor may further include a side dielectric layer formed on a side surface of the substrate so as to connect the upper dielectric layer and the lower dielectric layer, wherein a side electrode layer is formed on the side dielectric layer, and the upper dielectric layer and the lower dielectric layer are connected to the side electrode layer.

A capacitor according to another aspect of the present invention includes a plurality of unit capacitors sequentially stacked, wherein each of the plurality of unit capacitors includes: a substrate; a dielectric layer formed on the substrate; and an electrode layer comprising a first electrode layer and a second electrode layer formed on the dielectric layer, wherein the first electrode layer and the second electrode layer are separated from each other, and at least a portion of the first electrode layer and at least a portion of the second electrode layer are disposed on a same surface.

An upper portion and a lower portion of the electrode layer may be connected by applying heat and pressure.

An upper portion and a lower portion of the electrode layer may be connected through a conductive adhesive material. A capacitor according to another aspect of the present invention includes a plurality of unit capacitors formed on a substrate, wherein each of the plurality of unit capacitors includes: a dielectric layer; and an electrode layer comprising a first electrode layer and a second electrode layer formed on the dielectric layer, wherein the first electrode layer and the second electrode layer are separated from each other, and at least a portion of the first electrode layer and at least a portion of the second electrode layer are disposed on a same surface.

The plurality of unit capacitors may be two unit capacitors having different capacitances.

According to a capacitor of the present invention as described above, it has the following advantageous effects.

A capacitor of the present invention includes an electrode layer comprising a first electrode layer and a second electrode layer formed on the dielectric layer, wherein the first electrode layer and the second electrode layer are separated from each other, and at least a portion of the first electrode layer and at least a portion of the second electrode layer are disposed on the same surface, so that applying the electricity (i.e., electric current or electric voltage) becomes easy, and since the first and the second electrode layers function as the electrodes being charged with different polarity electrical charges respectively, manufacturing thereof becomes easy, and the structure thereof is simple.

The portion, which separates the first electrode layer and the second electrode layer, is disposed in the upper portion or the lower portion of the substrate, and the first electrode layer and the second electrode layer are formed so as to have different area from each other on the same surface, so that the capacitance can be maximized.

The substrate is comprised of a metallic material which can be anodized, and the dielectric layer is comprised of an anodized layer, and since the anodized layer formed by anodizing the substrate can be used as an upper and a lower dielectric layers without forming the upper and the lower dielectric layers separately, the manufacturing cost can be effectively reduced due to the simplified manufacturing process.

Furthermore, the dielectric layer comprises the upper and the lower dielectric layers formed on both of the upper and the lower surfaces of the substrate, and the electrode layer comprises the upper electrode layer formed on the upper surface of the upper dielectric layer and the lower electrode layer formed on the lower surface of the lowerer dielectric layer, and the upper electrode and the lower electrode layers are electrically connected so that the capacitance is maximized, and, at the same time, electricity can be applied to any one of the electrode layers without separately applying electricity to each of the electrode layers disposed on the upper and the lower side (of the dielectric layer), thus it is convenient.

A vertically penetrating through hole is formed at the substrate, and an internal dielectric layer continuously formed with (directly adjacent to) the upper dielectric layer and the lower dielectric layer is formed in the through hole, and a connecting electrode layer is located inside the internal dielectric layer so as to electrically connect the upper electrode layer and the lower electrode layer. Therefore, the upper electrode layer and the lower electrode layer can be effectively connected.

A side electrode layer formed on the side surface of the substrate may be further provided for connecting the upper electrode layer and the lower electrode layer, and a side dielectric layer may be formed on the side surface of the substrate so as to connect the upper and the lower dielectric layers, wherein a side electrode layer is formed on the side dielectric layer, and the upper and the lower electrode layers are connected to the side electrode layer. Thus, the upper and the lower electrode layers can be effectively connected to each other.

The capacitance of a capacitor of the present invention can be easily increased by sequentially stacking the unit capacitors.

The electrode layer disposed on the upper side and the lower side thereof can be connected by applying heat and pressure, or it can be connected through a conductive adhesive material, thus, connection between the electrodes being stacked can be easily accomplished.

The capacitance of a capacitor of the present invention includes: a plurality of unit capacitors formed on a substrate, the plurality of unit capacitors including: a dielectric layer; and an electrode layer comprising a first electrode layer and a second electrode layer formed on the dielectric layer, wherein the first electrode layer and the second electrode layer are separated from each other, and at least a portion of the first electrode layer and at least a portion of the second electrode layer are disposed on the same surface, and by including two unit capacitors having different capacitances the capacitance of the capacitor can be adjusted as necessary.

DETAILED DESCRIPTION OF EMBODIMENTS

Hereinafter, a preferred exemplary embodiment of the present invention will be described in detail with reference to the accompanying drawings.

For reference, among the elements of the present invention which will be described hereinafter, the elements identical to those of the prior art will be referred to the prior art and the detailed description thereof will be omitted.

The coordinates in the present description are defined in a way that X-axis corresponds to right direction, Y-axis corresponds to front direction, and Z-axis corresponds to upward direction.

In addition, for an example, the expression 'on the dielectric layer' means the outer side with respect to the substrate.

[Exemplary Embodiment 1]

As illustrated in FIGS. 1 to 5, a capacitor 1 of the present exemplary embodiment includes a plurality of unit capacitors 100 sequentially stacked, each of the plurality of unit capacitors 100 including: a substrate 110; a dielectric layer 120 formed on the substrate 110; and an electrode layer comprising a first electrode layer 140a and a second electrode layer 140b formed on the dielectric layer 120, wherein the first electrode layer 140a and the second electrode layer 140b are separated from each other, the portion separating the first electrode layer 140a and the second electrode layer 140b is disposed on the upper side and the lower side of the substrate 110, and at least a portion of the first electrode layer 140a and at least a portion of the second electrode layer 140b are disposed on the same surface.

Figure 1:
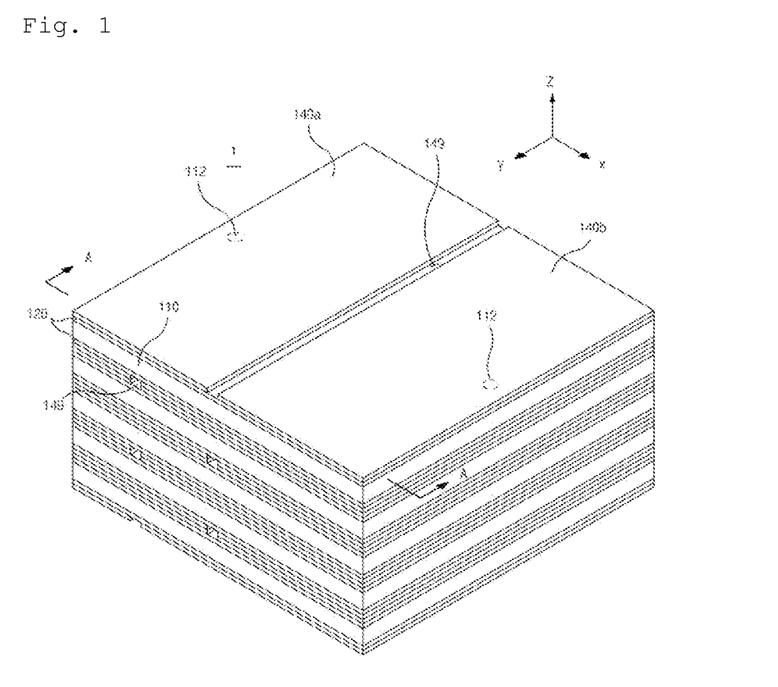
FIG. 1 is a perspective view of a capacitor according to the first exemplary embodiment of the present invention.
Figure 2:
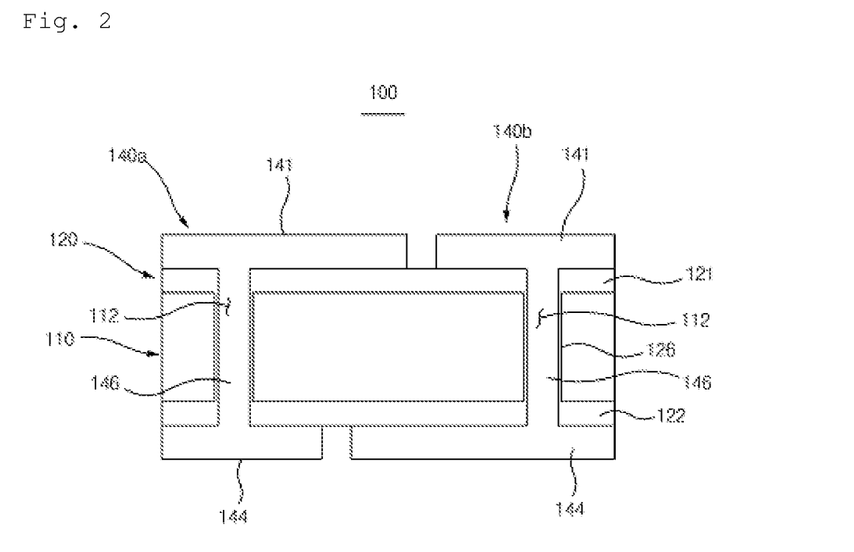
FIG. 2 is a cross-sectional view of a unit capacitor along the line A-A according to the first exemplary embodiment of the present invention.

The substrate 110 is formed in the shape of a rectangular plate, and located in the center of the unit capacitor 100.

Although there is no material limitation of the substrate 110, the substrate 110 is comprised of a metallic material such as aluminum which can be anodized, and the dielectric layer 120 described hereinafter is comprised of an anodized layer, and since the anodized layer formed by anodizing the substrate 110 can be used as the dielectric layer 120, the manufacturing cost can be effectively reduced due to the simplified manufacturing process.

Unlike this, the substrate 110 may be comprised of a material having dielectric property such as ceramics.

Two circular holes 112 vertically penetrating are formed on both sides of the substrate 110, The location of the holes 112 can be adjusted within the substrate 110.

The holes 112 are formed in the shape of a cylinder whose upper and lower surfaces are opened.

The dielectric layer 120 comprising a dielectric material is formed on the substrate 110, and includes an upper dielectric layer 121 and a lower dielectric layer 122 respectively formed on the upper surface and the lower surface of the substrate 110.

Further, an internal dielectric layer 126 continuously formed with (i.e., directly adjacent to) the upper dielectric layer 121 and the lower dielectric layer 122 is formed inside the holes 112.

The internal dielectric layer 126 is formed at the internal surface of the holes 112. That is, the internal dielectric layer 126 has a hollow cylindrical shape.

The internal dielectric layer 126 interconnects the upper dielectric layer 121 and the lower dielectric layer 122.

The internal dielectric layer 126 is also an anodized layer like the upper dielectric layer 121 and the lower dielectric layer 122 being formed by anodizing the substrate 110.

In other words, the upper dielectric layer 121, the lower dielectric layer 122, and the internal dielectric layer 126 are anodized after the holes 112 are formed at the substrate 110.

The electrode layer includes a first electrode layer 140a formed at a portion (left side) of the dielectric layer 120 and a second electrode layer 140b formed at another portion (right side) of the dielectric layer 120. The electrode layer is formed in the shape of a plate. The electrode layer may be formed though electroplating, and formed by using Cu, Ni, Ag, Au, Sn, and the like.

The first electrode layer 140a and the second electrode layer 140b are separated form each other, and a separation space 149 is formed between the first electrode layer 140a and the second electrode layer 140b. Therefore, the first electrode layer 140a and the second electrode layer 140b are not electrically connected. That is, the electrode layer is divided into two, and at least a portion of the first electrode layer 140a and at least a portion of the second electrode layer 140b is disposed on the same surface.

The separation space 149 is formed in a straight line along the forward and the backward directions. Air is disposed in the separation space 149.

The separation spaces 149 are disposed in the substrate 110 and the on the upper side and the lower side of the upper dielectric layer 121 and the lower dielectric layer 122 respectively.

The first electrode layer 140a and the second electrode layer 140b are formed corresponding to the dielectric layer 120 except the separation space 149.

The first electrode layer 140a and the second electrode layer 140b may be formed to have different areas or to have same areas.

Preferably, the first electrode layer 140a and the second electrode layer 140b have different areas on the same surface so that the vertically overlapping area between the first electrode layer 140a and the second electrode layer 140b become enlarged, thus, the capacitance can be maximized.

Each of the separation spaces 149 disposed in the upper side and the lower side is disposed in a way that they are not aligned along the vertical direction.

Figure 4:
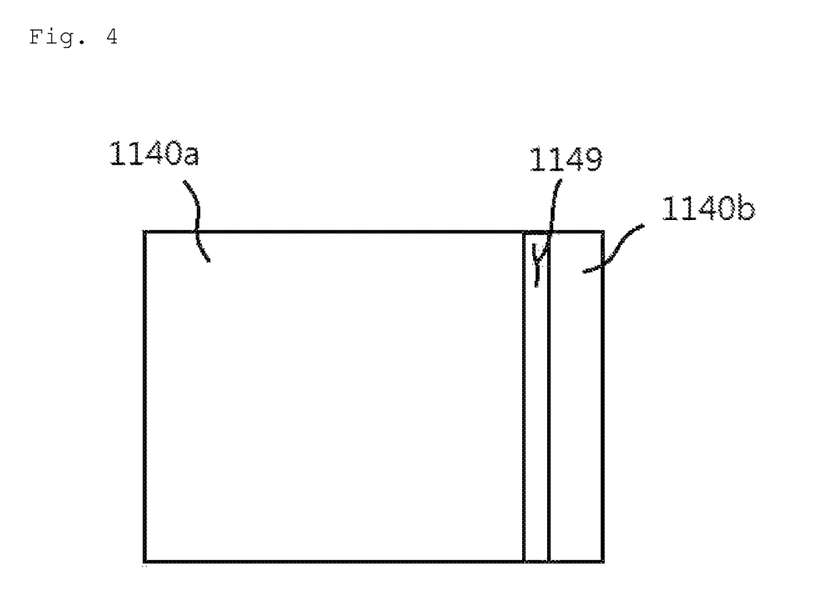
FIG. 4 is a plan view of a unit capacitor according to the first exemplary embodiment of the present invention.

For example, as illustrated in FIG. 4, the separation space 1149 disposed on the upper side is disposed close to the right side, and the separation space 1149 disposed on the lower side may be disposed close to the left side. Consequently, the area of the first electrode layer 1140a is larger than the second electrode layer 1140b on the upper surface of a unit capacitor 100, while the area of the first electrode layer 1140a is smaller than the second electrode layer 1140b on the lower surface of the unit capacitor 100. Also, the separation space 1149 disposed on the lower side is disposed close to the right side, and the separation space 1149 disposed on the upper side may be disposed close to the left side. When a plurality of unit capacitors 100 are stacked along the vertical direction, the above described two types of unit capacitors 100 are alternately disposed.

Figure 5:
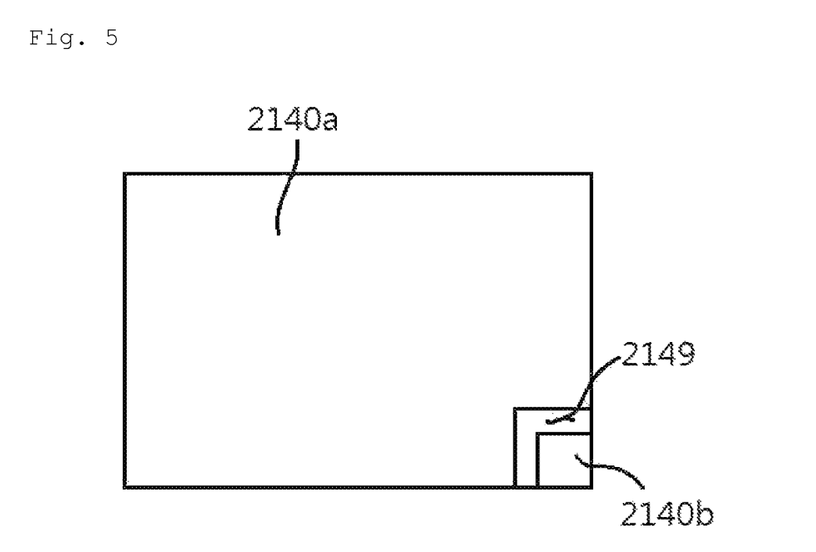
FIG. 5 is a plan view of a unit capacitor according to the first exemplary embodiment of the present invention.

Unlike this, as illustrated in FIG. 5, the separation space 2149 may be formed in inverted L-shape. In such case, the second electrode layer 2140b is disposed in the corner area of the unit capacitor 100, and the first electrode layer 2140a is disposed in the remaining area. Also, the area of the second electrode layer 2140b is formed to have a smaller area than the first electrode layer 2140a on the upper surface of a unit capacitor 100, but on the lower surface of a unit capacitor 100, they are formed in the opposite way.

The first electrode layer 140a and the second electrode layer 140b include the upper electrode layer 141 formed on the upper surface of the upper dielectric layer 121 and the lower electrode layer 144 formed on the lower surface of the lower dielectric layer 122 respectively.

The upper electrode layer 141 and the lower electrode layer 144 are electrically connected to each other.

Each of the first electrode layer 140a and the second electrode layer 140b further includes a connecting electrode 146 respectively.

The connecting electrode 146 is disposed on the internal dielectric layer 126 (i.e., inside the internal dielectric layer 126), and interconnects the upper electrode layer 141 and the lower electrode layer 144.

The connecting electrode layer 146 is formed in the shape of a cylinder. The outer surface of the connecting electrode layer 146 is in contact with the internal side surface of the internal dielectric layer 126.

As described above, since the upper electrode layer 141 and the lower electrode layer 144 are interconnected through the connecting electrode layer 146, electricity can be applied to any one of the electrode layers without separately applying electricity to each of the electrode layers, thus it is convenient.

Figure 3:
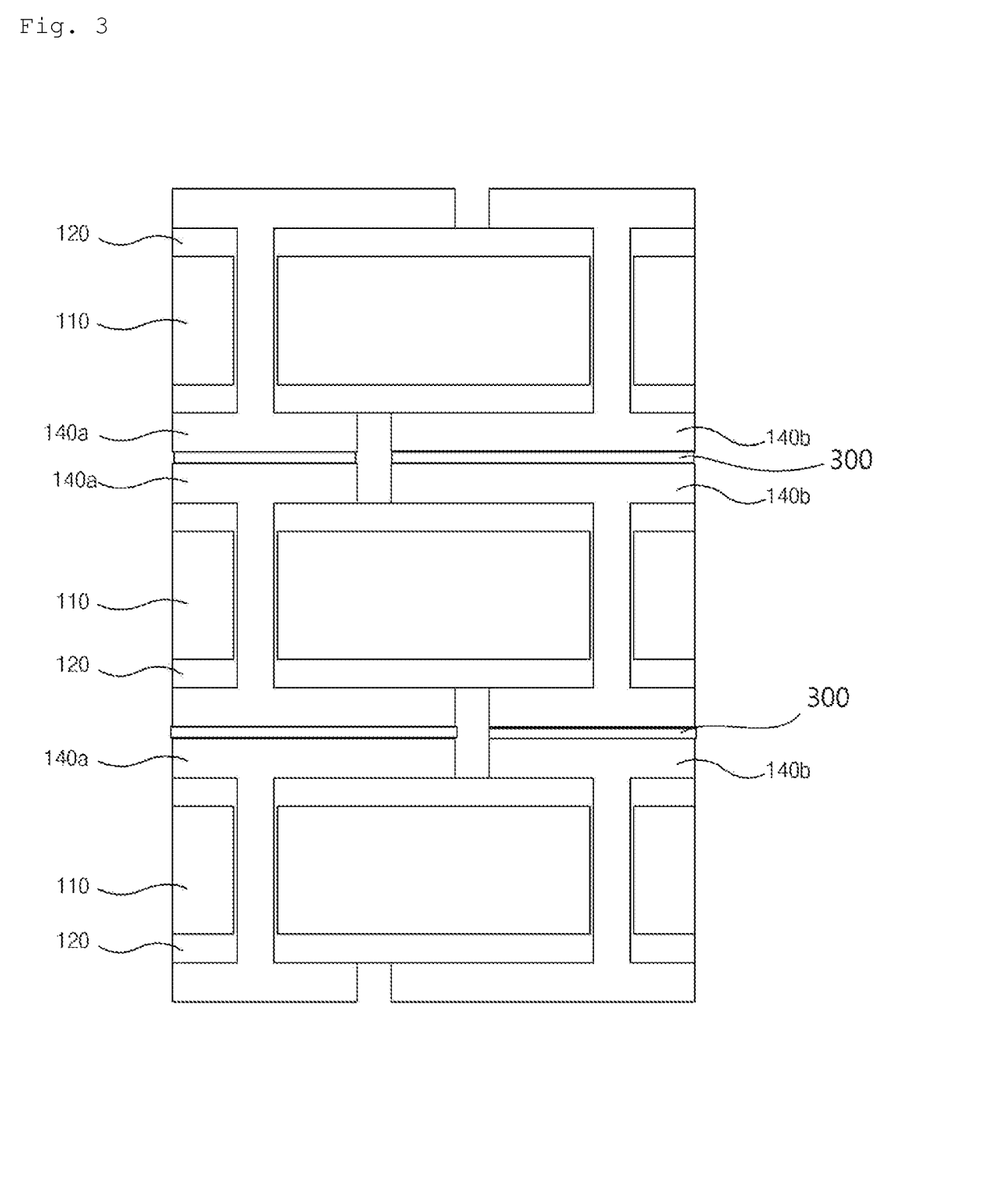
FIG. 3 is a cross-sectional view showing the stacked state of the unit capacitors according to the first exemplary embodiment of the present invention.

As illustrated in FIG. 3, the capacitor 1 is formed by vertically and sequentially stacking a plurality of unit capacitors 100. In this way, the capacitance can be easily increased by increasing the number of unit capacitors 100.

The electrode layer disposed on the upper side and the lower side (of the dielectric layer) can be electrically connected to each other by applying heat and pressure, or can be electrically connected through the conductive adhesive material.

In more detail, the above described electrode layers of the two unit capacitors 100 can be bonded through a solder layer 300.

Hereinafter, the operation of an exemplary embodiment having the aforementioned configuration.

When a voltage is applied between any one of the first electrode layer 140a (which has positive polarity) and any one of the second electrode layer 140b (which has negative polarity) of the any one of the unit capacitors 100, then, the voltage is applied to all of the first electrode layers 140a and all of the second electrode layers 140b of all the unit capacitors 100 respectively.

Thus, the capacitor 1 of the present exemplary embodiment is easy for being applied with electricity, and easy to be manufactured, and has a simple structure.

[Exemplary Embodiment 2]

The description of the elements identical to those of the above Exemplary Embodiment 1 will be omitted.

Figure 6:
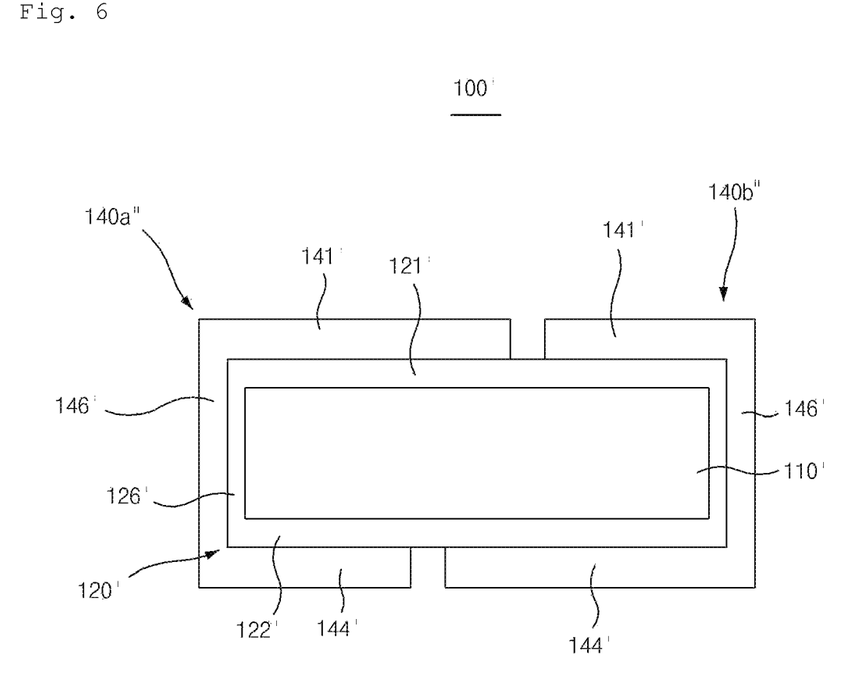
FIG. 6 is a cross-sectional view of a unit capacitor according to the second exemplary embodiment of the present invention.

The unit capacitor 100' of Exemplary Embodiment 2 has no hole in the substrate 110.

As illustrated in FIG. 6, the unit capacitor 100' according to Exemplary Embodiment 2 includes: a side dielectric layer 126' formed on the side surface of the substrate 110' for connecting an upper dielectric layer 121' and a lower dielectric layer 122' along the side surface, wherein a side electrode layer 146' is formed on the side dielectric layer 126', and the upper electrode layer 141' and the lower electrode layer 144' are connected to the side electrode layer 146'.

The side dielectric layer 126' is also an anodized layer formed by anodizing the substrate 110' comprising aluminum.

The side dielectric layers 126' are formed in the shape of a rectangle, and formed all over the right side surface and the left side surface of the substrate 110' respectively.

And, the side electrode layer 146' is formed on the side dielectric layer 126' (i.e., on the right side surface or the left side surface of the side dielectric layer 126'). That is, each of the first electrode layer 140a" and the second electrode layer 140b" includes the side electrode layer 146'.

The side electrode layer 146' connects the right side or the left side of the upper electrode layer 141' and the lower electrode layer 144' respectively. The side electrode layer 146' electrically connects the upper electrode layer 141' and the lower electrode layer 144' like the internal electrode layer of Exemplary Embodiment 1.

[Exemplary Embodiment 3]

The description of the elements identical to those of the above Exemplary Embodiments will be omitted.

Figure 7:
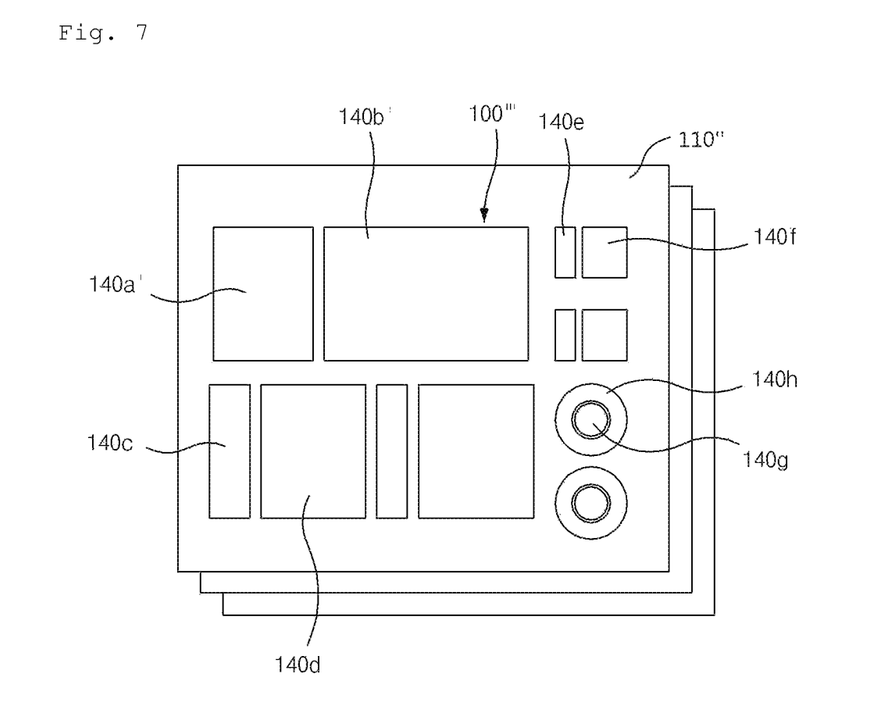
FIG. 7 is a plan view of a capacitor according to the third exemplary embodiment of the present invention.

As illustrated in FIG. 7, a capacitor according to Exemplary Embodiment 3 includes unit capacitors 100''', wherein each of the unit capacitors 100''' includes: a dielectric layer; and a plurality of electrode layers comprising the first electrode layers 140a', 140c, 140e, and 140g, and the second electrode layers 140b', 140d, 140f, and 140h, wherein the first electrode layers 140a', 140c, 140e, and 140g, and the second electrode layers 140b', 140d, 140f, and 140h, are separated from each other, and at least a portion of the first electrode layers 140a', 140c, 140e, and 140g, and at least a portion of the second electrode layers 140b', 140d, 140f, and 140h are disposed on the same surface, and a plurality of the unit capacitors 100''' are formed on a large single substrate 110''' to be separated from each other.

The plurality of unit capacitors 100''' can be formed to have various capacitances. In this case, the capacitance can be adjusted by applying electricity only to the requisite capacitor 100'''.

The dielectric layers of the plurality of unit capacitors 100''' are formed corresponding to the first electrode layers 140a', 140c, 140e, and 140g, and the second electrode layers 140b', 140d, 140f, and 140h respectively, so that they may be separated from each other. Unlike this, the dielectric layers of the plurality of the unit capacitors 100''' may be formed as a united body by combining them together.

As the aforementioned Exemplary Embodiment 1, the first electrode layers 140a', 140c, 140e, and 140g, and the second electrode layers 140b', 140d, 140f, and 140h are disposed on the upper side and the lower side of the substrate 110''' respectively, and the first electrode layers 140a', 140c, 140e, and 140g, and the second electrode layers 140b', 140d, 140f, and 140h disposed in the upper side and the lower side are electrically connected via the through holes.

Further, a large capacitance capacitor may be made by vertically stacking a plurality of the substrates 110'''.

One or a stacked substrates 110''' can be electrically bonded to a PCB formed with a certain circuit pattern by soldering so that each unit capacitors 100''' can be connected in series, in parallel, or in series and parallel.

[Exemplary Embodiment 4]

The description of the elements identical to those of the above Exemplary Embodiments will be omitted.

Figure 8:
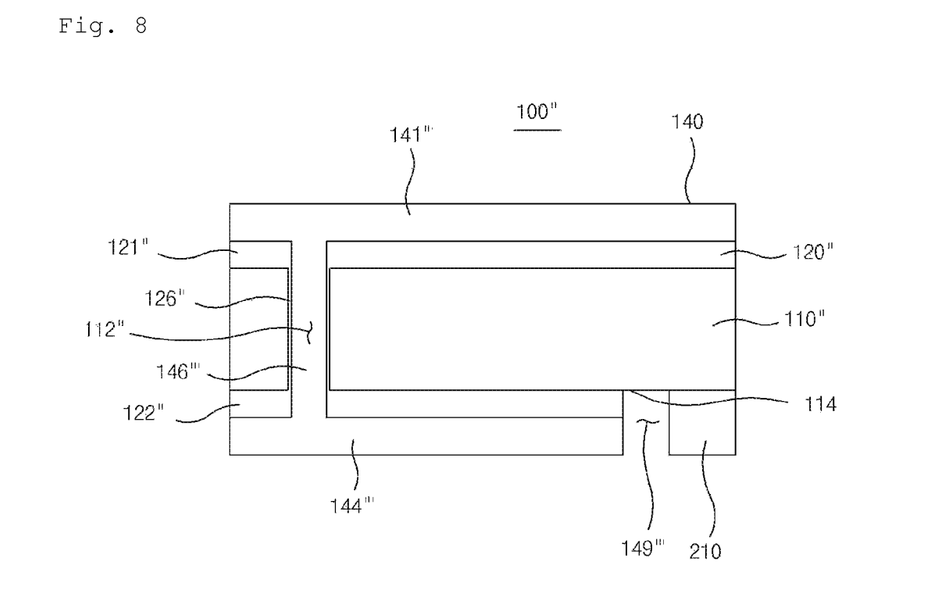
FIG. 8 is a cross-sectional view of a unit capacitor according to the fourth exemplary embodiment of the present invention.
Figure 9:
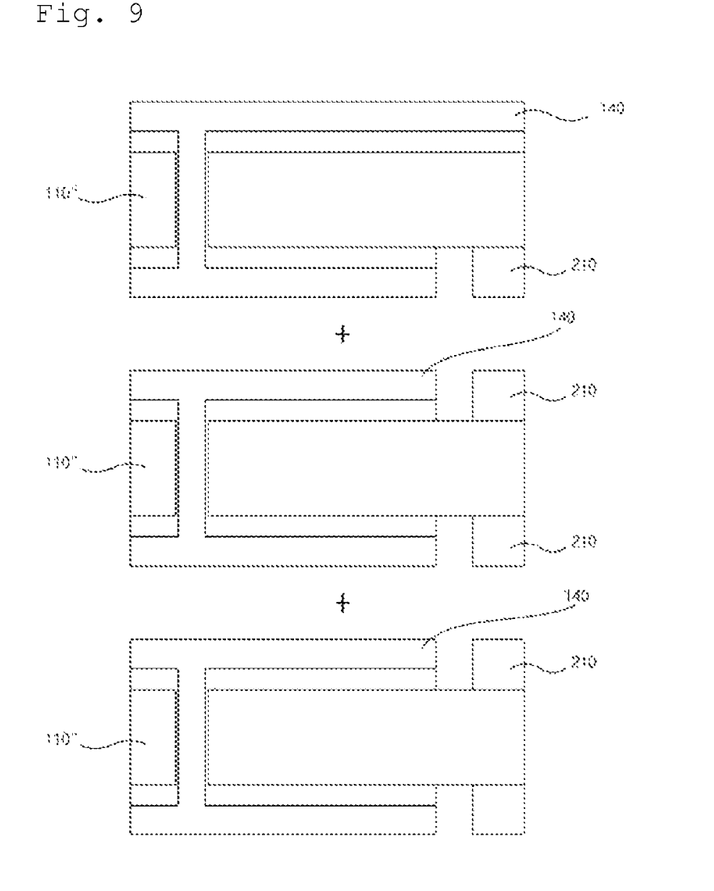
FIG. 9 is a cross-sectional view showing the stacked state of the unit capacitors according to the fourth exemplary embodiment of the present invention.

As illustrated in FIGS. 8 and 9, a capacitor according to Exemplary Embodiment 4 includes unit capacitors 100'', wherein each of the unit capacitors 100'' includes: a substrate 110'' formed with a vertically penetrating through hole 112'''; a dielectric layer 120'' formed on the entire area excluding a portion of the upper surface and the lower surface of the substrate 110''; an electrode layer 140 formed on the dielectric layer 120''; and a plurality of connecting members 210 for electrically connecting the substrates 110'' of the stacked unit capacitors 100''.

An exposed area 114, having no dielectric layer 120'' and no electrode layer 140 formed therein, is provided at a portion of both upper and lower surfaces of the substrate 110''. Also, no upper electrode layer 141'' and no lower electrode layer 144'' are formed on the exposed area 114. However, when the unit capacitors 100'' are being stacked, an exposed area is formed only at a portion of the lower surface of the uppermost unit capacitor 100'', and an exposed area 114 may be formed only at a portion of the upper surface of the lowermost unit capacitor 100''.

When using only one unit capacitor instead of stacking thereof, an exposed area 114 may be formed only at a portion of the upper surface or the lower surface thereof.

The exposed area 114 having the shape of a rectangle is located in the left side or in the front left side near the edge of the substrate 110".

Since the exposed area 114 is exposed outside the substrate 110" facilitating the application of electricity thereto.

Furthermore, since the exposed area is formed on the substrate 110", electrically interconnecting the plurality of the substrates 110" is easily accomplished using a connecting member 210 like a metal pin which will be described later, when a plurality of the unit capacitors 100" has been stacked.

Regarding the dielectric layer 120", as described in Exemplary Embodiment 1, an internal dielectric layer 126" is inserted inside the through hole 112". The internal dielectric layer 126" connects the upper dielectric layer 121" and the lower dielectric layer 122".

The upper dielectric layer 121" and the lower dielectric layer 122" are formed at the entire area of the upper and the lower surfaces of the substrate 110 excluding the exposed area 114. In other words, the upper dielectric layer 121" and the lower dielectric layer 122" have the shape of a rectangular plate wherein a portion of the left side thereof is being cut off.

The electrode layer 140 includes; an upper electrode layer 141''' disposed on the upper side of the upper dielectric layer 121"; a lower electrode layer 144''' disposed on the lower side of the lower dielectric layer 122"; and a connecting electrode layer 126''' disposed inside the dielectric layer 126 and electrically interconnecting the upper electrode layer 141''' and the lower electrode layer 144'''.

As illustrated in FIG. 9, a plurality of substrates 110" of the stacked unit capacitors 100" are electrically interconnected via the connecting member 210. The connecting member 210 is disposed spaced apart from the electrode portion 120", and a separation space 149" is formed between the connection member 210 and the electrode portion 120". The connection member 210 and the electrode portion 120" are disposed on the same surface.

The connection member 210 is comprised of a metal pin or a metal stripe, and formed on the plurality of the exposed areas 114.

The connection member 210 is vertically penetrating the exposed area 114 of the substrate 110" and inserted therein, or bonded to the upper and the lower portion of the exposed area 114 respectively. When stacking the unit capacitors 100", the connecting members 210 adjacent to the upper and the lower sides are being contacted and electrically connected.

Since the plurality of the substrates 110" are easily electrically connected through the connecting member 210, electricity is applied to all of the substrates 110" when electricity is applied to any one of the substrates 110".

The plurality of the unit capacitors 100" are stacked in a way that the electrode layers 140 thereof are in contact with each other. Therefore, all of the upper electrode layers 141''' and the lower electrode layers 144''' of the stacked unit capacitors 100" are electrically connected.

Thus, if negative electrical charges are applied to any one of the upper electrode layers 141''' or the lower electrode layers 144''', and positive electrical charges are applied to any one of the substrates 110", then all of the upper electrode layers 141''' and the lower electrode layers 144''' are charged with negative electrical charges, while all of the substrates 110" are charged with positive electrical charges.

As described above, although it is described with reference to the preferred exemplary embodiments of the present invention, it will be apparent to the person of ordinary skill in the art that various changes and alterations of the present invention can be made without departing from the technical spirit and the scope of the present invention written in the claims described herein below.

Description of Symbols

| | |
|---|---|
| 1: capacitor | 100: unit capacitor |
| 110: substrate | 112: through hole |
| 114: exposed area | 121: upper dielectric layer |
| 122: lower dielectric layer | |
| 126: internal dielectric layer | |
| 126': side dielectric layer | |
| 141: upper electrode layer | |
| 144: lower electrode layer | |
| 146: connecting electrode layer | |
| 146': side electrode layer | |
| 210: connecting member | |

What is claimed is:

1. A capacitor comprising:
   a substrate;
   a dielectric layer formed on the substrate, said dielectric layer comprising an upper dielectric layer and a lower dielectric layer respectively formed on an upper surface of the substrate and the lower surface of the substrate;
   a side dielectric layer formed on a side surface of the substrate so as to connect the upper dielectric layer and the lower dielectric layer; and
   an electrode layer comprising a first electrode layer and a second electrode layer formed on the dielectric layer, wherein the first electrode layer and the second electrode layer are separated from each other, and at least a portion of the first electrode layer and at least a portion of the second electrode layer are disposed on a same surface,
   wherein the electrode layer comprises an upper electrode layer formed on an upper surface of the upper dielectric layer and a lower electrode layer formed on a lower surface of the lower dielectric layer;
   wherein the upper electrode layer and the lower electrode layer are electrically connected to each other; and
   wherein a side electrode layer formed on the side dielectric layer, and the upper dielectric layer and the lower dielectric layer are connected to the side electrode layer.

2. The capacitor according to claim 1, wherein a portion which separates the first electrode layer and the second electrode layer is disposed at an upper portion or a lower portion of the substrate.

3. The capacitor according to claim 1, wherein the first electrode layer and the second electrode layer are formed so as to have different areas from each other on the same surface.

4. The capacitor according to claim 1, wherein the substrate is comprised of a metallic material capable of being anodized, and the dielectric layer is comprised of an anodized layer.

5. The capacitor according to claim 1, wherein the substrate is comprised of a material having a dielectric property.

6. A capacitor comprising a plurality of unit capacitors sequentially stacked, wherein each of the plurality of unit capacitors includes:
   a substrate;

a dielectric layer formed on the substrate, said dielectric layer comprising an upper dielectric layer and a lower dielectric layer respectively formed on an upper surface of the substrate and the lower surface of the substrate;

a side dielectric layer formed on a side surface of the substrate so as to connect the upper dielectric layer and the lower dielectric layer; and an electrode layer comprising a first electrode layer and a second electrode layer formed on the dielectric layer, wherein the first electrode layer and the second electrode layer are separated from each other, and at least a portion of the first electrode layer and at least a portion of the second electrode layer are disposed on a same surface;

wherein the electrode layer comprises an upper electrode layer formed on an upper surface of the upper dielectric layer and a lower electrode layer formed on a lower surface of the lower dielectric layer;

wherein the upper electrode layer and the lower electrode layer are electrically connected to each other; and wherein a side electrode layer formed on the side dielectric layer, and the upper dielectric layer and the lower dielectric layer are connected to the side electrode layer.

7. The capacitor according to claim 6, wherein an upper portion and a lower portion of the electrode layer are connected by applying heat and pressure.

8. The capacitor according to claim 6, wherein an upper portion and a lower portion of the electrode layer is connected through a conductive adhesive material.

\* \* \* \* \*